(12) United States Patent
Langmead et al.

(10) Patent No.: US 7,389,222 B1
(45) Date of Patent: Jun. 17, 2008

(54) TASK PARALLELIZATION IN A TEXT-TO-TEXT SYSTEM

(75) Inventors: Greg Langmead, Playa del Rey, CA (US); Kenji Yamada, Los Angeles, CA (US); Kevin Knight, Hermosa Beach, CA (US); Daniel Marcu, Hermosa Beach, CA (US)

(73) Assignee: Language Weaver, Inc., Marina Del Rey, CA (US)

( * ) Notice: Subject to any disclaimer, the term of this patent is extended or adjusted under 35 U.S.C. 154(b) by 42 days.

(21) Appl. No.: 11/412,307

(22) Filed: Apr. 26, 2006

Related U.S. Application Data (63) Continuation of application No. 11/196,785, filed on Aug. 2, 2005, now abandoned.

(51) Int. Cl.
*G06F 17/28* (2006.01)
*G06F 17/27* (2006.01)
*G10L 11/00* (2006.01)

(52) U.S. Cl. .......................... 704/2; 704/9; 704/270.1
(58) Field of Classification Search ...................... None
See application file for complete search history.

(56) References Cited

U.S. PATENT DOCUMENTS

| | | |
|---|---|---|
| 4,502,128 A | 2/1985 | Okajima et al. |
| 4,599,691 A | 7/1986 | Sakaki et al. |
| 4,787,038 A | 11/1988 | Doi et al. |
| 4,814,987 A | 3/1989 | Miyao et al. |
| 4,942,526 A | 7/1990 | Okajima et al. |
| 5,146,405 A | 9/1992 | Church |
| 5,181,163 A | 1/1993 | Nakajima et al. |
| 5,212,730 A | 5/1993 | Wheatley et al. |
| 5,267,156 A | 11/1993 | Nomiyama |
| 5,311,429 A | 5/1994 | Tominaga |
| 5,432,948 A | 7/1995 | Davis et al. |
| 5,477,451 A | 12/1995 | Brown et al. |
| 5,510,981 A | 4/1996 | Berger et al. |
| 5,644,774 A | 7/1997 | Fukumochi et al. |
| 5,696,980 A | 12/1997 | Brew |
| 5,724,593 A | 3/1998 | Hargrave, III et al. |
| 5,761,631 A | 6/1998 | Nasukawa |

(Continued)

FOREIGN PATENT DOCUMENTS

EP 0469884 A2 2/1992

(Continued)

OTHER PUBLICATIONS

Abney, Stephen, "Parsing By Chunks," 1991, Principle-Based Parsing: Computation and Psycholinguistics, vol. 44, pp. 257-279.

(Continued)

*Primary Examiner*—David Hudspeth
*Assistant Examiner*—Brian L. Albertalli
(74) *Attorney, Agent, or Firm*—Carr & Ferrell LLP (57) ABSTRACT

Parallelization of word alignment for a text-to-text operation. The training data is divided into multiple groups, and training is carried out of each group on separate processors. Different techniques can be carried out to increase the speed of the processing. The hookups can be done only once for all of multiple different iterations. Moreover, parallel operations can apply only to the counts, since this may be the most time-consuming part.

20 Claims, 2 Drawing Sheets

U.S. PATENT DOCUMENTS

| | | | |
|---|---|---|---|
| 5,781,884 | A | 7/1998 | Pereira et al. |
| 5,805,832 | A | 9/1998 | Brown et al. |
| 5,848,385 | A | 12/1998 | Poznanski et al. |
| 5,867,811 | A | 2/1999 | O'Donoghue |
| 5,870,706 | A | 2/1999 | Alshawi |
| 5,903,858 | A | 5/1999 | Saraki |
| 5,909,681 | A * | 6/1999 | Passera et al. .............. 707/8 |
| 5,987,404 | A | 11/1999 | Della Pietra et al. |
| 5,991,710 | A | 11/1999 | Papineni et al. |
| 6,031,984 | A | 2/2000 | Walser |
| 6,032,111 | A | 2/2000 | Mohri |
| 6,092,034 | A | 7/2000 | McCarley et al. |
| 6,119,077 | A | 9/2000 | Shinozaki |
| 6,131,082 | A | 10/2000 | Hargrave, III et al. |
| 6,182,014 | B1 | 1/2001 | Kenyon et al. |
| 6,205,456 | B1 | 3/2001 | Nakao |
| 6,223,150 | B1 | 4/2001 | Duan et al. |
| 6,236,958 | B1 | 5/2001 | Lange et al. |
| 6,278,967 | B1 | 8/2001 | Akers et al. |
| 6,285,978 | B1 | 9/2001 | Bernth et al. |
| 6,289,302 | B1 | 9/2001 | Kuo |
| 6,304,841 | B1 | 10/2001 | Berger et al. |
| 6,311,152 | B1 | 10/2001 | Bai et al. |
| 6,327,568 | B1 * | 12/2001 | Joost ................... 704/270.1 |
| 6,360,196 | B1 | 3/2002 | Poznanski et al. |
| 6,389,387 | B1 | 5/2002 | Poznanski et al. |
| 6,393,388 | B1 | 5/2002 | Franz et al. |
| 6,393,389 | B1 | 5/2002 | Chanod et al. |
| 6,415,250 | B1 | 7/2002 | van den Akker |
| 6,460,015 | B1 | 10/2002 | Hetherington et al. |
| 6,502,064 | B1 | 12/2002 | Miyahira et al. |
| 6,782,356 | B1 | 8/2004 | Lopke |
| 6,810,374 | B2 | 10/2004 | Kang |
| 6,904,402 | B1 | 6/2005 | Wang et al. |
| 7,107,215 | B2 | 9/2006 | Ghali |
| 7,113,903 | B1 | 9/2006 | Riccardi et al. |
| 7,219,051 | B2 * | 5/2007 | Moore ......................... 704/5 |
| 2002/0188438 | A1 | 12/2002 | Knight et al. |
| 2002/0198701 | A1 | 12/2002 | Moore |
| 2004/0030551 | A1 | 2/2004 | Marcu et al. |
| 2006/0190241 | A1 * | 8/2006 | Goutte et al. ................. 704/2 |

FOREIGN PATENT DOCUMENTS

| | | | |
|---|---|---|---|
| EP | 0715265 | A2 | 6/1996 |
| EP | 0933712 | A2 | 8/1999 |
| JP | 07244666 | | 1/1995 |
| JP | 10011447 | | 1/1998 |
| JP | 11272672 | | 10/1999 |

OTHER PUBLICATIONS

Al-Onaizan et al., "Statistical Machine Translation," 1999, JHU Summer Tech Workshop, Final Report, pp. 1-42.

Al-Onaizan, Y. and Knight, K., "Named Entity Translation: Extended Abstract" 2002, Proceedings of HLT-02, San Diego, CA.

Al-Onaizan, Y. and Knight, K., "Translating Named Entities Using Monolingual and Bilingual Resources," 2002, Proc. of the 40th Annual Meeting of the ACL,pp. 400-408.

Al-Onaizan et al., "Translating with Scarce Resources," 2000, 17th National Conference of the American Association for Artificial Intelligence, Austin, TX, pp. 672-678.

Alshawi et al., "Learning Dependency Translation Models as Collections of Finite-State Head Transducers," 2000, Computational Linguistics, vol. 26, pp. 46-60.

Arbabi et al., "Algorithms for Arabic name transliteration," Mar. 1994, IBM Journal of Research and Development, vol. 38, Issue 2, pp. 183-194.

Barnett et al., "Knowledge and Natural Language Processing," Aug. 1990, Communications of the ACM, vol. 33, Issue 8, pp. 50-71.

Bangalore, S. and Rambow, O., "Corpus-Based Lexical Choice in Natural Language Generation," 2000, Proc. of the 38th Annual ACL, Hong Kong, pp. 464-471.

Bangalore, S. and Rambow, O., "Exploiting a Probabilistic Hierarchical Model for Generation," 2000, Proc. of 18th conf. on Computational Linguistics, vol. 1, pp. 42-48.

Bangalore, S. and Rambow, O., "Evaluation Metrics for Generation," 2000, Proc. of the 1st International Natural Language Generation Conf., vol. 14, p. 1-8.

Bangalore, S. and Rambow, O., "Using TAGs, a Tree Model, and a Language Model for Generation," May 2000, Workshop TAG+5, Paris.

Baum, Leonard, "An Inequality and Associated Maximization Technique in Statistical Estimation for Probabilistic Functions of Markov Processes", 1972, Inequalities 3:1-8.

Bikel et al., "An Algorithm that Learns What's in a Name," 1999, Machine Learning Journal Special Issue on Natural Language Learning, vol. 34, pp. 211-232.

Brants, Thorsten, "TnT—A Statistical Part-of-Speech Tagger," 2000, Proc. of the 6th Applied Natural Language Processing Conference, Seattle.

Brill, Eric. "The Transformation-Based Error-Driven Learning and Natural Language Processing: A Case Study in Part of Speech Tagging", 1995, Computational Linguistics, vol. 21, No. 4, pp. 543-565.

Brown et al., "A Statistical Approach to Machine Translation," Jun. 1990, Computational Linguistics, vol. 16, No. 2, pp. 79-85.

Brown, Ralf, "Automated Dictionary Extraction for "Knowledge-Free" Example-Based Translation," 1997, Proc. of 7th Int'l Conf. on Theoretical and Methodological Issues in MT, Santa Fe, NM, pp. 111-118.

Brown et al., "The Mathematics of Statistical Machine Translation: Parameter Estimation," 1993, Computational Linguistics, vol. 19, Issue 2, pp. 263-311.

Brown et al., "Word-Sense Disambiguation Using Statistical Methods," 1991, Proc. of 29th Annual ACL, pp. 264-270.

Carl, Michael. "A Constructivist Approach to Machine Translation," 1998, New Methods of Lanuage Processing and Computational Natural Language Learning, pp. 247-256.

Chen, K. and Chen, H., "Machine Translation: An Integrated Approach," 1995, Proc. of 6th Int'l Conf. on Theoretical and Methodological Issue in MT, pp. 287-294.

Chinchor, Nancy, "MUC-7 Named Entity Task Definition," 1997, Version 3.5.

Clarkson, P. and Rosenfeld, R., "Statistical Language Modeling Using the CMU-Cambridge Toolkit", 1997, Proc. ESCA Erospeech, Rhodes, Greece, pp. 2707-2710.

Corston-Oliver, Simon, "Beyond String Matching and Cue Phrases: Improving Efficiency and Coverage In Discourse Analysis", 1998, The AAAI Spring Symposium on Intelligent Text Summarization, pp. 9-15.

Dagan, I. and Itai, A., "Word Sense Disambiguation Using a Second Language Monolingual Corpus", 1994, Computational Linguistics, vol. 20, No. 4, pp. 563-596.

Dempster et al., "Maximum Likelihood from Incomplete Data via the EM Algorithm", 1977, Journal of the Royal Statistical Society, vol. 39, No. 1, pp. 1-38.

Diab, M. and Finch, S., "A Statistical Word-Level Translation Model for Comparable Corpora," 2000, In Proc.of the Conference on ContentBased Multimedia Information Access (RIAO).

Elhadad, M. and Robin, J., "An Overview of SURGE: a Reusable Comprehensive Syntactic Realization Component," 1996, Technical Report 96-03, Department of Mathematics and Computer Science, Ben Gurion University, Beer Sheva, Israel.

Elhadad, M. and Robin, J., "Controlling Content Realization with Functional Unification Grammars", 1992, Aspects of Automated Natural Language Generation, Dale et al. (eds)., Springer Verlag, pp. 89-104.

Elhadad et al., "Floating Constraints in Lexical Choice", 1996, ACL, 23(2): 195-239.

Elhadad, Michael, "FUF: the Universal Unifier User Manual Version 5.2", 1993, Department of Computer Science, Ben Gurion University, Beer Sheva, Israel.

Elhadad. M. and Robin, J., "SURGE: a Comprehensive Plug-in Syntactic Realization Component for Text Generation", 1999 (available at http://www.cs.bgu.ac.il/~elhadad/pub.html).

Elhadad, Michael, "Using Argumentation to Control Lexical Choice: A Functional Unification Implementation", 1992, Ph.D. Thesis, Graduate School of Arts and Sciences, Columbia University.

Fung, Pascale, "Compiling Bilingual Lexicon Entries From a Non-Parallel English-Chinese Corpus", 1995, Proc. of the Third Workshop on Very Large Corpora, Boston, MA, pp. 173-183.

Fung, P. and Yee, L., "An IR Approach for Translating New Words from Nonparallel, Comparable Texts", 1998, 36th Annual Meeting of the ACL, 17th International Conference on Computational Linguistics, pp. 414-420.

Gale, W. and Church, K., "A Program for Aligning Sentences in Bilingual Corpora," 1991, 29th Annual Meeting of the ACL, pp. 177-183.

Germann, Ulrich, "Building a Statistical Machine Translation System from Scratch: How Much Bang for the Buck Can We Expect?" Proc. of the Data-Driven MT Workshop of ACL-01, Toulouse, France, 2001.

Germann et al., "Fast Decoding and Optimal Decoding for Machine Translation", 2001, Proc., of the 39th Annual Meeting of the ACL, Toulouse, France, pp. 228-235.

Diab, Mona, "An Unsupervised Method for Multilingual Word Sense Tagging Using Parallel Corpora: A Preliminary Investigation", 2000, SIGLEX Workshop on Word Senses and Multi-Linguality, pp. 1-9.

Grefenstette, Gregory, "The World Wide Web as a Resource of Example-Based Machine Translation Tasks", 1999, Translating and the Computer 21, Proc. of the 21st International Conf. on Translating and the Computer, London, UK, 12 pp.

Hatzivassiloglou, V. et al., "Unification-Based Glossing", 1995, Proc. of the International Joint Conference on Artificial Intelligence, pp. 1382-1389.

Ide, N. and Veronis, J., "Introduction to the Special Issue on Word Sense Disambiguation: The State of the Art", Mar. 1998, Computational Linguistics, vol. 24, Issue 1, pp. 2-40.

Imamura, Kenji, "Hierarchical Phrase Alignment Harmonized with Parsing", 2001, in Proc. of NLPRS, Tokyo.

Jelinek, F., "Fast Sequential Decoding Algorithm Using a Stack", Nov. 1969, IBM J. Res. Develop., vol. 13, No. 6, pp. 675-685.

Jones, K. Sparck, "Experiments in Relevance Weighting of Search Terms", 1979, Information Processing & Management, vol. 15, Pergamon Press Ltd., UK, pp. 133-144.

Knight, K. and Yamada, K., "A Computational Approach to Deciphering Unknown Scripts," 1999, Proc. of the ACL Workshop on Unsupervised Learning in Natural Language Processing.

Knight, K. and Al-Onaizan, Y., "A Primer on Finite-State Software for Natural Language Processing", 1999 (available at http://www.isi.edu/licensed-sw/carmel).

Knight, Kevin, "A Statistical MT Tutorial Workbook," 1999, JHU Summer Workshop (available at http://www.isi.edu/natural-language/mt/wkbk.rtf).

Knight, Kevin, "Automating Knowledge Acquistion for Machine Translation," 1997, AI Magazine 18(4).

Knight, K. and Chander, I., "Automated Postediting of Documents," 1994, Proc. of the 12th Conference on Artificial Intelligence, pp. 779-784.

Knight, K. and Luk, S., "Building a Large-Scale Knowledge Base for Machine Translation," 1994, Proc. of the 12th Conference on Artificial Intelligence, pp. 773-778.

Knight, Kevin, "Connectionist Ideas and Algorithms," Nov. 1990, Communications of the ACM, vol. 33, No. 11, pp. 59-74.

Knight, Kevin, "Decoding Complexity in Word-Replacement Translation Models", 1999, Computational Linguistics, 25(4).

Knight et al., "Filling Knowledge Gaps in a Broad-Coverage Machine Translation System", 1995, Proc. of the 14th International Joint Conference on Artificial Intelligence, Montreal, Canada, vol. 2, pp. 1390-1396.

Knight, Kevin, "Integrating Knowledge Acquisition and Language Acquisition," May 1992, Journal of Applied Intelligence, vol. 1, No. 4.

Knight et al., "Integrated Knowledge Bases and Statistics in MT," 1994, Proc. of the Conference of the Association for Machine Translation in the Americas.

Knight, Kevin, "Learning Word Meanings by Instruction," 1996, Proc. of the National Conference on Artificial Intelligence, vol. 1, pp. 447-454.

Knight, K. and Graehl, J., "Machine Transliteration", 1997, Proc. of the ACL-97, Madrid, Spain.

Knight, K. et al., "Machine Transliteration of Names in Arabic Text," 2002, Proc. of the ACL Workshop on Computational Approaches to Semitic Languages.

Knight, K. and Marcu, D., "Statistics-Based Summarization—Step One: Sentence Compression," 2000, American Association for Artificial Intelligence Conference, pp. 703-710.

Knight et al., "Translation with Finite-State Devices," 1998, Proc. of the 3rd Amta Conference, pp. 421-437.

Knight, K. and Hatzivassiloglou, V., "Two-Level, Many-Paths Generation," 1995, Proc. of the 33rd Annual Conference of the ACL, pp. 252-260.

Knight, Kevin, "Unification: A Multidisciplinary Survey," 1989, ACM Computing Surveys, vol. 21, No. 1.

Koehn, P. and Knight, K., "ChunkMT: Statistical Machine Translation with Richer Linguistic Knowledge," Apr. 2002, Information Sciences Institution.

Koehn, P. and Knight, K., "Estimating Word Translation Probabilities from Unrelated Monolingual Corpora Using the EM Algorithm," 2000, Proc. of the 17th meeting of the AAAI.

Koehn, P. and Knight, K., "Knowledge Sources for Word-Level Translation Models," 2001, Conference on Empirical Methods in Natural Language Processing.

Kurohashi, S. and Nagao, M., "Automatic Detection of Discourse Structure by Checking Surface Information in Sentences," 1994, Proc. of COL-LING '94, vol. 2, pp. 1123-1127.

Langkilde-Geary, Irene, "An Empirical Verification of Coverage and Correctness for a General-Purpose Sentence Generator," 1998, Proc. 2nd Int'l Natural Language Generation Conference.

Langkilde-Geary, Irene, "A Foundation for General-Purpose Natural Language Generation: Sentence Realization Using Probabilistic Models of Language," 2002, PH.D. Thesis, Faculty of the Graduate School, University of Southern California.

Langkilde, Irene, "Forest-Based Statistical Sentence Generation," 2000, Proc. of the 1st Conference on North American chapter of the ACL, Seattle, WA, pp. 170-177.

Langkilde, I. and Knight, K., "The Practical Value of N-Grams in Generation," 1998, Proc. of the 9th International Natural Language Generation Workshop, p. 248-255.

Langkilde, I. and Knight, K., "Generation that Exploits Corpus-Based Statistical Knowledge," 1998, Proc. of the Coling-ACL, pp. 704-710.

Mann, G. and Yarowsky, D., "Multipath Translation Lexicon Induction via Bridge Languages," 2001, Proc. of the 2nd Conference of the North American Chapter of the ACL, Pittsburgh, PA, pp. 151-158.

Manning, C. and Schutze, H., "Foundations of Statistical Natural Language Processing," 2000, The MIT Press, Cambridge, MA [redacted].

Marcu, D. and Wong, W., "A Phrase-Based, Joint Probability Model for Statistical Machine Translation," 2002, Proc. of ACL-2 conference on Empirical Methods in Natural Language Processing, vol. 10, pp. 133-139.

Marcu, Daniel, "Building Up Rhetorical Structure Trees," 1996, Proc. of the National Conference on Artificial and Innovative Applications of Artificial Intelligence Conference, vol. 2, pp. 1069-1074.

Marcu, Daniel, "Discourse trees are good indicators of importance in text," 1999, Advances in Automatic Text Summarization, The MIT Press, Cambridge, MA.

Marcu, Daniel, "Instructions for Manually Annotating the Discourse Structures of Texts," 1999, Discourse Annotation, pp. 1-49.

Marcu, Daniel, "The Rhetorical Parsing of Natural Language Texts," 1997, Proceedings of ACL/EACL '97, pp. 96-103.

Marcu, Daniel, "The Rhetorical Parsing, Summarization, and Generation of Natural Language Texts," 1997, PH.D. Thesis, Graduate Department of Computer Science, University of Toronto.

Marcu, Daniel, "Towards a Unified Approach to Memory- and Statistical-Based Machine Translation," 2001, Proc. of the 39th Annual Meeting of the ACL, pp. 378-385.

Melamed, I. Dan, "A Word-to-Word Model of Translational Equivalence," 1997, Proc. of the 35th Annual Meeting of the ACL, Madrid, Spain, pp. 490-497.

Melamed, I. Dan, "Automatic Evaluation and Uniform Filter Cascades for Inducing N-Best Translation Lexicons," 1995, Proc. of the 3rd Workshop on Very Large Corpora, Boston, MA, pp. 184-198.

Melamed, I. Dan, "Empirical Methods for Exploiting Parallel Texts," 2001, MIT Press, Cambridge, MA [table of contents].

Meng et al., "Generating Phonetic Cognates to Handle Named Entities in English-Chinese Cross-Language Spoken Document Retrieval," 2001, IEEE Workshop on Automatic Speech Recognition and Understanding, pp. 311-314.

Mike et al., "A full-text retrieval system with a dynamic abstract generation function," 1994, Proceedings of SI-GIR '94, pp. 152-161.

Mikheev et al., "Named Entity Recognition without Gazeteers," 1999, Proc. of European Chapter of the ACL, Bergen, Norway, pp. 1-8.

Monasson et al., "Determining computational complexity from characteristic 'phase transitions'," Jul. 1999, Nature Magazine, vol. 400, pp. 133-137.

Mooney, Raymond, "Comparative Experiments on Disambiguating Word Senses: An Illustration of the Role of Bias in Machine Learning," 1996, Proc. of the Conference on Empirical Methods in Natural Language Processing, pp. 82-91.

Niessen, S. and Ney, H, "Toward hierarchical models for statistical machine translation of inflected languages," 2001, Data-Driven Machine Translation Workshop, Toulouse, France, pp. 47-54.

Och, F. and Ney, H, "Improved Statistical Alignment Models," 2000, 38th Annual Meeting of the ACL, Hong Kong, pp. 440-447.

Och et al., "Improved Alignment Models for Statistical Machine Translation," 1999, Proc. of the Joint Conf. of Empirical Methods in Natural Language Processing and Very Large Corpora, pp. 20-28.

Papineni et al., "Bleu: a Method for Automatic Evaluation of Machine Translation," 2001, IBM Research Report, RC22176(WO102-022).

Pla et al., "Tagging and Chunking with Bigrams," 2000, Proc. of the 18th Conference on Computational Linguistics, vol. 2, pp. 614-620.

Rapp, Reinhard, Automatic Identification of Word Translations from Unrelated English and German Corpora, 1999, 37th Annual Meeting of the ACL, pp. 519-526.

Rapp, Reinhard, "Identifying Word Translations in Non-Parallel Texts," 1995, 33rd Annual Meeting of the ACL, pp. 320-322.

Resnik, P. and Yarowsky, D., "A Perspective on Word Sense Disambiguation Methods and Their Evaluation," 1997, Proceedings of SIGLEX '97, Washington, DC, pp. 79-86.

Resnik, Philip, "Mining the Web for Bilingual Text," 1999, 37th Annual Meeting of the ACL, College Park, MD, pp. 527-534.

Rich, E. and Knight, K., "Artificial Intelligence, Second Edition," 1991, McGraw-Hill Book Company [redacted].

Richard et al., "Visiting the Traveling Salesman Problem with Petri nets and application in the glass industry," Feb. 1996, IEEE Emerging Technologies and Factory Automation, pp. 238-242.

Robin, Jacques, "Revision-Based Generation of Natural Language Summaries Providing Historical Background: Corpus-Based Analysis, Design Implementation and Evaluation," 1994, PH.D. Thesis, Columbia University, New York.

Sang, E. and Buchholz, S., "Introduction to the CoNLL-2000 Shared Task: Chunking," 20002, Proc. of CoNLL-2000 and LLL-2000, Lisbon, Portugal, pp. 127-132.

Schmid, H., and Walde, S., "Robust German Noun Chunking With a Probabilistic Context-Free Grammar," 2000, Proc. of the 18th Conference on Computational Linguistics, vol. 2, pp. 726-732.

Selman et al., "A New Method for Solving Hard Satisfiability Problems," 1992, Proc. of the 10th National Conference on Artificial Intelligence, San Jose, CA, pp. 440-446.

Schutze, Hinrich, "Automatic Word Sense Discrimination," 1998, Computational Linguistics, Special Issue on Word Sense Disambiguation, vol. 24, Issue 1, pp. 97-123.

Sobashima et al., "A Bidirectional Transfer-Driven Machine Translation System for Spoken Dialogues," 1994, Proc. of 15th Conference on Computational Linguistics, vol. 1, pp. 64-68.

Shapiro, Stuart (ed.), "Encyclopedia of Artificial Intelligence, 2nd edition", vol. 2, 1992, John Wiley & Sons Inc; "Unification"article, K. Knight, pp. 1630-1637.

Soricut et al., "Using a large monolingual corpus to improve translation accuracy," 2002, Lecture Notes in Computer Science, vol. 2499, Proc. of the 5th Conference of the Association for Machine Translation in the Americas on Machine Translation: From Research to Real Users, pp. 155-164.

Stalls, B. and Knight, K., "Translating Names and Technical Terms in Arabic Text," 1998, Proc. of the Coling/ACL Workshop on Computational Approaches to Semitic Language.

Sun et al., "Chinese Named Entity Identification Using Class-based Language Model," 2002, Proc. of 19th International Conference on Computational Linguistics, Taipei, Taiwan, vol. 1, pp. 1-7.

Sumita et al., "A Discourse Structure Analyzer for Japanese Text," 1992, Proc. of the International Conference on FIfth Generation Computer Systems, vol. 2, pp. 1133-1140.

Taylor et al., "The Penn Treebank: An Overview,"in A. Abeill (ed.), Treebanks: Building and Using Parsed Corpora, 2003, pp. 5-22.

Tiedemann, Jorg, "Automatic Construction of Weighted String Similarity Measures," 1999, in Proceedings of the Joint SIGDAT Conference on Emperical Methods in Natural Language Processing and Very Large Corpora.

Tillmann et al., "A DP based Search Using Monotone Alignments in Statistical Translation," 1997, Proc. of the Annual Meeting of the ACL, pp. 366-372.

Tillman, C. and Xia, F., "A Phrase-Based Unigram Model for Statistical Machine Translation," 2003, Proc. of the North American Chapter of the ACL on Human Language Technology, vol. 2, pp. 106-108.

Veale, T. and Way, A., "Gaijin: A Bootstrapping, Template-Driven Approach to Example-Based MT," 1997, Proc. of New Methods in Natural Language Processing (NEMPLP97), Sofia, Bulgaria.

Vogel, S. and Ney, H., "Construction of a Hierarchical Translation Memory," 2000, Proc. of Cooling 2000, Saarbrucken, Germany, pp. 1131-1135.

Vogel et al., "The CMU Statistical Machine Translation System," 2003, Machine Translation Summit IX, New Orleans, LA.

Vogel et al., "The Statistical Translation Module in the Verbmobil System," 2000, Workshop on Multi-Lingual Speech Communication, pp. 69-74.

Wang, Ye-Yi, "Grammer Interference and Statistical Machine Translation," 1998, PH.D Thesis, Carnegie Mellon University, Pittsburgh, PA.

Watanbe et al., "Statistical Machine Translation Based on Hierarchical Phrase Alignment," 2002, 9th International Conference on Theoretical and Methodological Issues in Machin Translation (TMI-2002), Keihanna, Japan, pp. 188-198.

Witbrock, M. and Mittal, V., "Ultra-Summarization: A Statistical Approach to Generating Highly Condensed Non-Extractive Summaries," 1999, Proc. of SIGIR '99, 22nd International Conference on Research and Development in Information Retrieval, Berkeley, CA, pp. 315-316.

Wang, Y. and Waibel, A., "Decoding Algorithm in Statistical Machine Translation," 1996, Proc. of the 35th Annual Meeting of the ACL, pp. 366-372.

Wu, Dekai, "Stochastic Inversion Transduction Grammers and Bilingual Parsing of Parallel Corpora," 1997, Computational Linguistics, vol. 23, Issue 3, pp. 377-403.

Wu, Dekai, "A Polynomial-Time Algorithm for Statistical Machine Translation," 1996, Proc. of 34th Annual Meeting of the ACL, pp. 152-158.

Yamada, K. and Knight, K., "A Decoder for Syntax-based Statistical MT," 2001, Proceedings of the 40th Annual Meeting of the ACL, pp. 303-310.

Yamada, K. and Knight, K. "A Syntax-based Statistical Translation Model," 2001, Proc. of the 39th Annual Meeting of the ACL, pp. 523-530.

Yamamoto et al., "A Comparative Study on Translation Units for Bilingual Lexicon Extraction," 2001, Japan Academic Association for Copyright Clearance, Tokyo, Japan.

Yarowsky, David, "Unsupervised Word Sense Disambiguation Rivaling Supervised Methods," 1995, 33rd Annual Meeting of the ACL, pp. 189-196.

Callan et al., "TREC and TIPSTER Experiments with INQUERY," 1994, Information Processing and Management, vol. 31, Issue 3, pp. 327-343.

Cohen, Yossi, "Interpreter for FUF," (available at ftp://ftp.cs.bgu.ac.il/pub/people/elhadad/fuf-life.If).

Mohri, M. and Riley, M., "An Efficient Algorithm for the N-Best-Strings Problem," 2002, Proc. of the 7th Int. Conf. on Spoken Language Processing (ICSLP'02), Denver, CO, pp. 1313-1316.

Nederhof, M. and Satta, G., "IDL-Expression: A Formalism for Representing and Parsing Finite Languages in Natural Language Processing," 2004, Journal of Artificial Intelligence Research, vol. 21, pp. 281-287.

Och, F. and Ney, H., "Discriminative Training and Maximum Entropy Model for Statistical Machine Translation," 2002, Proc. of the 40th Annual Meeting of the ACL, Philadelphia, PA, pp. 295-302.

Resnik, P. and Smith, A., "The Web as a Parallel Corpus," Sep. 2003, Computational Linguistics, Special Issue on Web as Corpus, vol. 29, Issue on Web as Corpus, vol. 29, Issue 3, pp. 349-380.

Russell, S. and Norvig, P., "Artificial Intelligence: A Modern Approach," 1995, Prentice-Hall, Inc., New Jersey [redacted—table of contents].

Ueffing et al., "Generation of Word Graphs in Statistical Machine Translation," 2002, Proc. of Empirical Methods in Natural Language Processing (EMNLP), pp. 156-163.

Kumar, R. and Li, H., "Integer Programming Approach to Printed Circuit Board Assembly Time Optimization," 1995, IEEE Transactions on Components, Packaging, and Manufacturing, Part B: Advance Packaging, vol. 18, No. 4, pp. 720-727.

\* cited by examiner

TASK PARALLELIZATION IN A TEXT-TO-TEXT SYSTEM

CROSS REFERENCE TO RELATED APPLICATIONS

The present application is a continuation of U.S. patent application Ser. No. 11/196,785, filed Aug. 2, 2005 now abandoned, and entitled "Task Parallelization in a Text-to-Text System," which is herein incorporated by reference.

BACKGROUND

Text to text applications include machine translation and other machine intelligence systems such as speech recognition and automated summarization. These systems often rely on training that is carried out based on information from specified databases known as corpora.

A training pipeline may include many millions of words. It is not uncommon for the training to take weeks. There is often a tradeoff between the speed of the processing and the accuracy of the obtained information.

It is desirable to speed up the training of such a system.

SUMMARY

The present application describes parallelization of certain aspects of training. Specifically, an embodiment describes how to parallelize a training task which requires knowledge about previous training portions.

DETAILED DESCRIPTION

The general structure and techniques, and more specific embodiments which can be used to effect different ways of carrying out the more general goals are described herein.

A current training system may require as long as two weeks to train 100 million words. Of course, faster processors may reduce that time. Parallelization of these operations by partitioning the input corpus is not straightforward, however, since certain operations may require accumulation of accumulated results from other operations. Multiple operations that are operating in multiple processors would not have access to the results of the other processors.

In evaluating the entire training pipeline for machine translation, it was noticed that word alignment takes by far the most time of the entire process. For example, word alignment may take an order of magnitude longer than any of the other 11 processes that are used during training. Parallelization of word alignment can hence speed up training.

Figure 1:
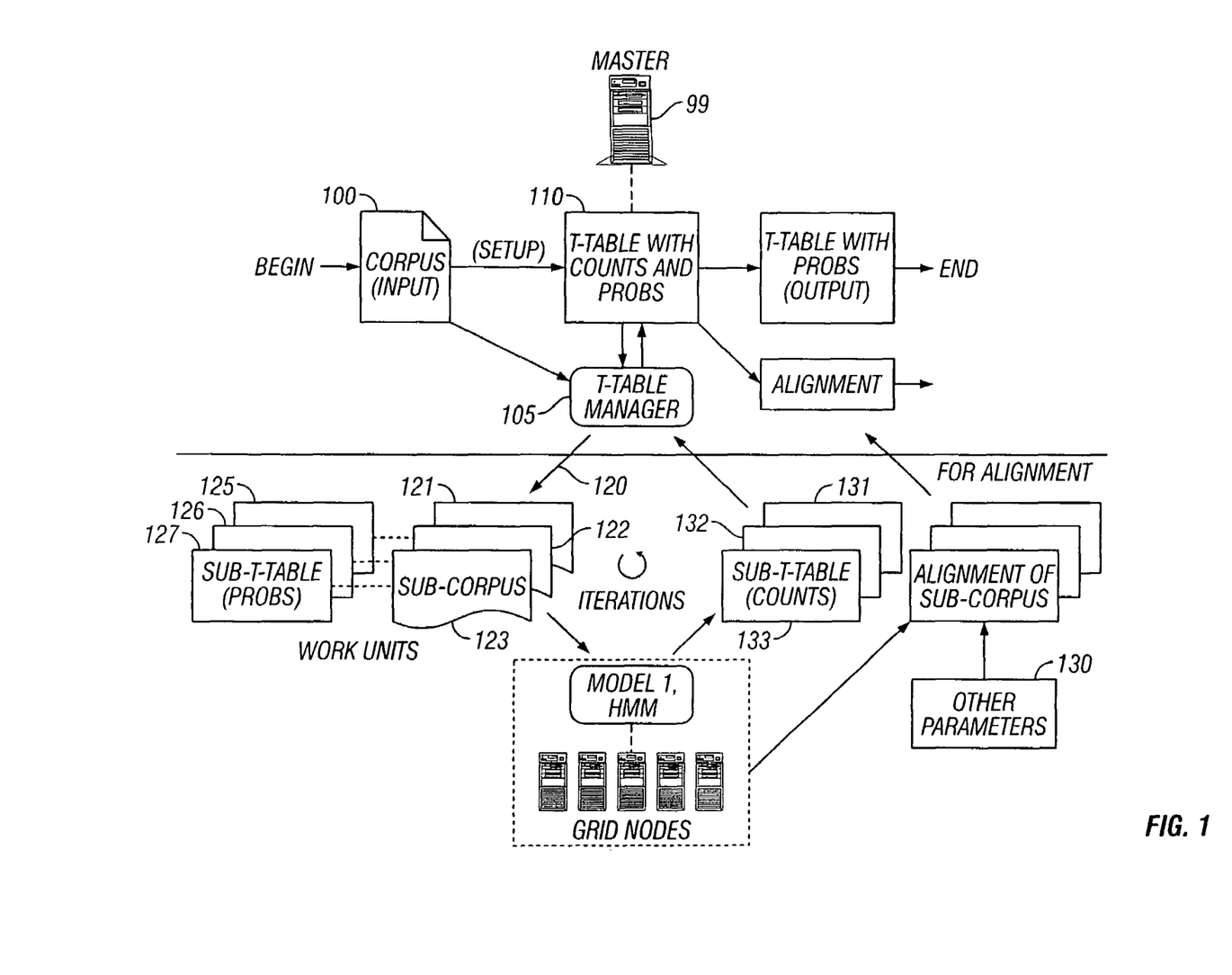
FIG. 1 shows a block diagram of a machine text training system.

The embodiment shown in FIG. 1 uses multiple different known techniques to determine word alignment. For example, FIG. 1 shows using a Model 1, and an HMM model to determine word alignment. The overall algorithm is the well-known expectation maximization algorithm to determine the most likely hookups between the words in parallel corpora of data.

In operation, the expectation maximization algorithm collects counts which are formed from arbitrary choices of probabilities between words in the full corpus. The words in the corpus are analyzed, to find all word to word pairings. A determination of probabilities of hookups is used to form a table of counts. That table of counts is then used, along with the corpus, to determine further probabilities. This process is then iterated.

The task of determining the word alignments requires analysis of both the table of probabilities from the final iteration of the expectation maximization algorithm, as well as the corpus information.

Since the accumulation and normalization of count information is necessary, dividing this task into multiple processors is not a straightforward issue of simply dividing the work among processors and performing multiple isolated iterations of expectation maximization.

FIG. 1 illustrates an embodiment of the word alignment operations that can be carried out in multiple parallelized processors. The corpus 100 includes the training material, that includes, for example, parallel information in two different languages. This training material is used to create the final probability tables and alignment. A master computer 99 executes the operations flowcharted according to FIG. 2. The master computer maintains a "T table", which is a table of probabilities of word to word translation and other model parameters.

The master computer 99 runs a T table manager 105 which updates the interim T table and other model parameters 110 with counts and probabilities. The T table manager accumulates all of the data from all of the different evaluation passes through the corpus. These evaluations may create parameters and information other than the T table. The embodiment emphasizes the T table, because it is usually very large and hence its manipulation and storage requires significant resources, such as computer RAM. Many, if not all word alignment models, also share this set of parameters. The embodiment contemplates operation with other models such as HMM, model 2 and others. These models may use additional parameters, which may not be specifically discussed herein.

Figure 2:
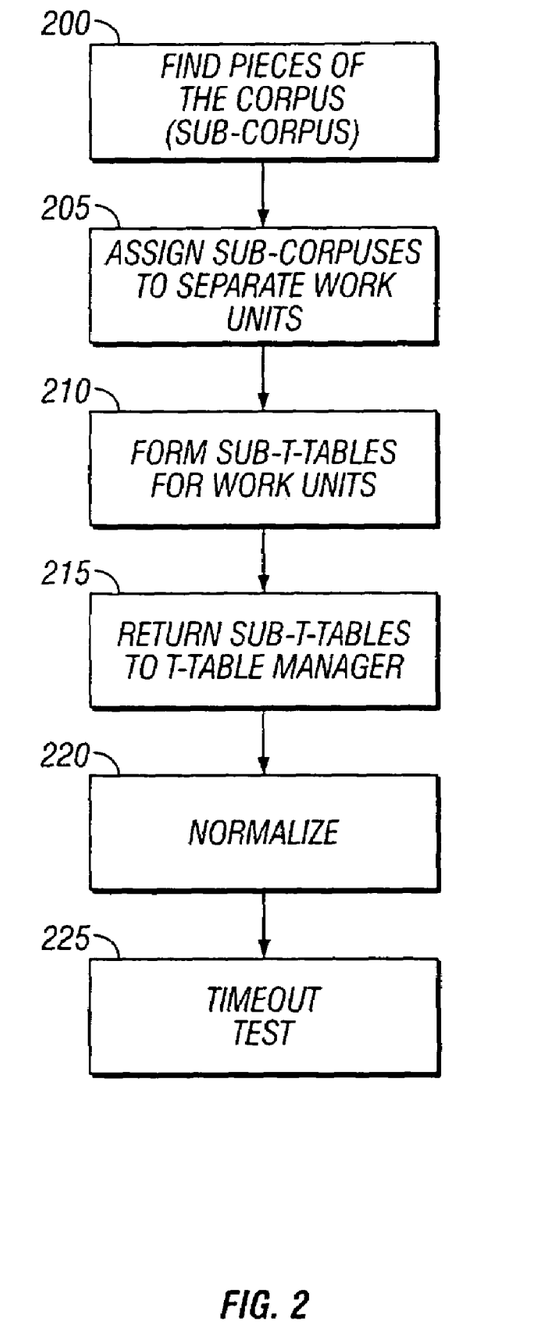
FIG. 2 illustrates a flowchart of operation.

At 200, the master determines pieces of the corpus, shown as 120. Each of those pieces forms a sub corpus 121, 122, 123. These form one component of a "work unit". The master also creates sub T tables at 210 that include only the word-to-word hookups that occur in the corresponding sub-corpus, shown as 125, 126, 127. The smaller tables minimize the memory requirements of the work unit.

If the model has additional parameters, these are included in the work unit as well.

Computing which word-to-word hookups appear in a given sub-corpus is expensive in terms of computer resources. The system used herein uses multiple computing iterations. One aspect enables reusing the returned sub-T-table output from previous iterations, rather than recomputing those hookups for each iteration.

The first iteration must build the sub-T-tables from scratch. However, rather than creating all of those sub-T-tables on the master machine, the first iteration is made "special". In the first iteration, only the sub-corpus is sent as a work unit. Each worker computes the hookups and create their sub-T-table. Each worker machine uses the sub-T-table and sub-corpus to compute parameter counts as per the normal expectation maximization operation. When all desired iterations are complete, the worker machines compute the final alignment of the sub-corpus, using the same sub-T-table and other parameters of the model.

These counts in the form of sub T tables 131, 132, 133, and possibly other parameter tables shown generically as 136 are then returned to the T table manager 105 at 215. The T table manager 105 collects the count information, and normalizes using the new information, to form new probabilities at 220. The T table manager sends the new probabilities back to the work units for their use in evaluating their next units of work. After all iterations are complete, the work units return a final alignment of the sub-corpora. This allows the master machine to simply concatenate these in the proper order, completing the full word alignment process.

The probabilities include word to word translation parameters and other model parameters. In operation, for example, the corpus may be passed through both the model 1 algorithm and the HMM algorithm five times. Each pass through the algorithm updates the probabilities in the T table and other tables. The tables are then used for further iterations and eventually alignment.

The T table manager is shown in FIG. 1 and in 200 as breaking the corpus into the sub corpora 121, 122, 123. Of course, this can be done by a separate process running within the master computer 99. The corpora can be broken up in a number of different ways.

The work units should each obtain roughly similar amounts of work. The amount of work to be done by a work unit may be proportional to the sentence lengths. Accordingly, it is desirable for the different work units to have roughly similar amounts of work to do in each sub work corpus.

A first way of breaking up the data relies on the corpora being probabilistically similar. Probabilistically, lengths of random sentences within the corpora should be approximately average. Therefore, a first way of effecting 200 in FIG. 2 is via a round robin between sentences. Each machine is assigned a different randomly selected sentence. The effectively random selection of the sentence is likely to produce sentences with roughly equal word lengths in each subunit.

Another embodiment of 200 sorts the corpus by sentence lengths, and assigns sentences in order from the sentence length sorted corpus. In this way, all work units receive roughly similar length sentences.

The T table manager 105 normalizes between each iteration to produce new T table information from the sub T tables.

According to another embodiment, the T table manager may divide the information in N units, where N is different than the number of machines doing the actual computations. The units are queued up in the T table manager, and are used by the machines during their operation. A work unit queuing system, such as "Condor", may be used to allocate and provide work to the different units, as each machine becomes available.

The master processor may also carry out other operations in between accumulating the T table results. For example, the master processor may allocate the work units, may itself become a work unit, for a complete unit, or for some unit smaller than the usual work unit.

The calculations by the work units may also be time-monitored by either the master processor or some other processor. Some units may become stragglers, either because they are processing a particularly difficult work unit, or because the computer itself has some error therein of either hardware or software. According to another aspect, the work allocation unit maintains a time out unit shown as 225. If the time becomes longer than a specified time, then the unit may be allocated to another work machine. The first machine to return a result is accepted.

The pseudocode for the word alignment follows:

INPUT: CORPUS C, OUTPUT ALIGNMENT $A_{BIG}$
1. INPUT: NUMBERIZED CORPUS C
2. INIT LARGE T TABLE $T_{BIG}$ AND OTHER MODEL PARAMETERS $P_{BIG}$ USING C (ZERO PROBABILITIES)
3. DIVIDE CORPUS INTO N PIECES $\{C_I\}$, I=1, . . . , N
   a. C → $\{C_I\}$
4. DO N WORK UNITS OF INITIALIZATION (CREATE SMALL T TABLES AND ASSIGN UNIFORM COUNTS)
   a. $C_I$ →$O_I$ (COUNTS), I=1, . . . , N
5. ADD ALL COUNTS AND NORMALIZE, AND WRITE NEW SUB T TABLES
   a. $T_{BIG}$, $\{O_I\}$ →$T_{BIG}$, $\{T_I\}$
6. DO N WORK UNITS OF ONE ITERATION OF A MODEL
   a. $C_I$, $T_I$ → $O_I$ (COUNTS), I=1, . . . , N
7. REPEAT STEPS 5 AND 6 FOR EACH MODEL 1 ITERATION, THEN EACH HMM ITERATION, ETC. UNTIL ALL ITERATIONS ARE COMPLETE. END AFTER FINAL RUN OF STEP 5.
8. DO N WORK UNITS OF ALIGNMENT USING THE LAST-TRAINED MODEL
   a. $C_I$, $T_I$ → $A_I$ (ALIGNMENTS), I=1, . . . , N
9. SIMPLY CONCATENATE THE ALIGNMENTS TO OBTAIN AN ALIGNMENT OF THE FULL CORPUS.
   a. $\{A_I\}$ →$A_{BIG}$
10. RETURN $A_{BIG}$ AS THE RESULT.

It may be useful to return some of the intermediate parameter tables themselves as well, which is commonly done in machine translation, for example.

To summarize the above psuedocode, the operations of the computer are as follows: first the corpus is split into pieces, to form small T tables with uniform probabilities, as an initialization. The counts are added and normalized over multiple iterations of different models. After that iteration, alignment is carried out using the most-recently trained model and the alignments are concatenated to obtain an alignment of the full corpus.

Although only a few embodiments have been disclosed in detail above, other embodiments are possible and are intended to be encompassed within this specification. The specification describes specific examples to accomplish a more general goal that may be accomplished in other way. This disclosure is intended to be exemplary, and the claims are intended to cover any modification or alternative which might be predictable to a person having ordinary skill in the art. For example, while the above describes parallelizing a word alignment, it should be understood that any machine based text application that requires accumulation of probabilities can be parallelized in this way. While the above has described the work being broken up in a specified way, it should be understood that the work can be broken up in different ways. For example, the T-table manager can receive data other than counts and/or probabilities from the sub units and may compute information from raw data obtained from the T-table manager.

Also, only those claims which use the words "means for" are intended to be interpreted under 35 USC 112, sixth paragraph. Moreover, no limitations from the specification are intended to be read into any claims, unless those limitations are expressly included in the claims.

What is claimed is:

1. A method comprising:

dividing a corpus of information among multiple work units and carrying out a text-to text operation in each of said work units; and maintaining a single parameter table for all the work carried out in all the work units, wherein said parameter table is a probability table with probabilities of word to word translation.

2. A method as in claim 1, wherein said text-to-text determination operation is a word alignment.

3. A method as in claim 1, wherein said text to text operation that is carried out in each of said work units forms a table of counts based on probabilities of hookups for word to word pairing.

4. A method as in claim 1, wherein said text to text operation is carried out in multiple computing iterations.

5. A method as in claim 4, wherein at least one subsequent iteration uses a parameter table from a previous iteration.

6. A method as in claim 4, wherein said multiple computing iterations include a first iteration which computes word-to-word hookup information, and a subsequent iteration which uses said hookup information from the first iteration.

7. A method as in claim 1, wherein said text-to-text operation uses a model 1 algorithm.

8. A method as in claim 1, wherein said dividing comprises a random division of information.

9. A method as in claim 1, wherein said dividing comprises sorting information, and selecting units of information based on said sorting.

10. A method as in claim 1, further comprising monitoring said each of said work units to detect work units that are requiring longer calculation times than other work units.

11. A method as in claim 1, wherein said carrying out a determination comprises doing an initialization, and subsequently doing multiple iterations beyond said initialization.

12. A method as in claim 11, further comprising carrying out alignment after said iterations.

13. A computer system, comprising:
a master computer, connected to a corpus of training information about text-to-text operations, having a plurality of work unit computers, having separate processors from said master computer, and said master computer running a routine that maintains a table of information related to training based on said corpus, a routine that provides separated portions of said corpus and said work unit computers, and accumulates information indicative of training each of said work unit computers and maintains said table of information, wherein said table of information includes a probability of word to word translation.

14. A computer system as in claim 13, wherein said master computer also processes at least one of said separated portions of said corpus.

15. A computer system as in claim 13, wherein said training in said working unit computers comprises a word alignment operation.

16. A computer system as in claim 13, wherein said training in said work unit computers comprises multiple computing iterations based on the same data.

17. A computer system as in claim 13, further comprising using a parameter table from a previous iteration in a subsequent iteration.

18. A method, comprising:
dividing a training corpus into at least a plurality of groups;
carrying out a training operation for a text to text application substantially simultaneously on each of said plurality of groups, using separate processors for each of said groups and using a single table of information indicative of word probabilities, for each of said groups, and using said training operation to update said single probability table based on training information obtained from each of said groups, wherein said single probability table comprises probabilities of word to word translations.

19. A method as in claim 18, wherein said training operation is a word alignment.

20. A method as in claim 18, wherein said training operation is a computation of counts.

* * * * *

UNITED STATES PATENT AND TRADEMARK OFFICE
CERTIFICATE OF CORRECTION

PATENT NO. : 7,389,222 B1 Page 1 of 1
APPLICATION NO. : 11/412307
DATED : June 17, 2008
INVENTOR(S) : Greg Langmead et al.

It is certified that error appears in the above-identified patent and that said Letters Patent is hereby corrected as shown below:

After the first paragraph of the specification related to a cross reference and before the section entitled BACKGROUND, please enter the following section heading and sentence:

STATEMENT REGARDING FEDERALLY SPONSORED RESEARCH OR DEVELOPMENT

This invention was made with government support under Contract No. N66001-00-1-8914 awarded by the Space and Naval Warfare Systems Command. The government has certain rights in the invention.

Signed and Sealed this

Twenty-second Day of June, 2010

David J. Kappos
*Director of the United States Patent and Trademark Office*